United States Patent
Willwerth

Patent Number: 6,134,425
Date of Patent: Oct. 17, 2000

[54] DIGITAL MODULE RF SECTION

[75] Inventor: Frank Willwerth, Arlington, Mass.

[73] Assignee: The United States of America as represented by the Secretary of the Air Force, Washington, D.C.

[21] Appl. No.: 09/137,873

[22] Filed: Aug. 17, 1998

[51] Int. Cl.⁷ .............................. H04B 1/26; H04B 1/16; H03K 9/00; H04L 25/06

[52] U.S. Cl. .......................... 455/130; 455/130; 455/131; 455/339; 375/316; 375/318

[58] Field of Search ..................................... 455/130, 131, 455/205, 307, 337, 339, 340, 341, 142, 313, 324, 334; 375/316, 318

[56] References Cited

U.S. PATENT DOCUMENTS 4,893,316  1/1990  Janc et al. .................................. 375/44
5,375,146  12/1994  Chalmers .................................. 375/103

Primary Examiner—Daniel S. Hunter
Assistant Examiner—Meless Zewdu
Attorney, Agent, or Firm—William G. Auton

[57] ABSTRACT

A miniature RF receiver in the UHF frequency band. This receiver design is specific to the implementation of a digital module, as it contains no downconversion elements, and provides the capability of defining the operational frequency with cascaded tunable filter stages. The tunable filters are combline filters with tuning varactor diodes terminating each printed resonator. The 1 dB bandwidth of the filter is 7 Mhz, and for resonator length of 31 degrees (at the center frequency), the filter bandwidth remains nearly constant across the tunable frequency range. The capacitance of a varactor diode is a function of applied voltage. By controlling the voltage to each varactor, the filter response can be tuned across the operational frequency range of 50 Mhz.

1 Claim, 2 Drawing Sheets

DIGITAL MODULE RF SECTION

STATEMENT OF GOVERNMENT INTEREST

The invention described herein may be manufactured and used by or for the Government for governmental purposes without the payment of any royalty thereon.

BACKGROUND OF THE INVENTION

Field of the Invention

This invention relates to communication equipment, and more particularly to a design of a miniature RF receiver in the UHF frequency band. This receiver design is specific to the implementation of a digital module, as it contains no downconversion elements, and provides the capability of defining the operational frequency with cascaded tunable filter stages.

SUMMARY OF THE INVENTION

The present invention is a design of a miniature RF receiver in the UHF frequency band. This receiver design is specific to the implementation of a digital module, as it contains no downconversion elements, and provides the capability of defining the operational frequency with cascaded tunable filter stages.

The tunable filters are combline filters with tuning varactor diodes terminating each printed resonator. The 1 dB bandwidth of the filter is 7 Mhz, and for resonator length of 31 degrees (at the center frequency), the filter bandwidth remains nearly constant across the tunable frequency range. The capacitance of a varactor diode is a function of applied voltage. By controlling the voltage to each varactor, the filter response can be tuned across the operational frequency range of 50 Mhz. The filter is also perfectly matched to the input and output transmission lines across the tunable frequency range. The capacitance of a varactor diode is a function of applied voltage. By controlling the voltage to each varactor, the filter response can be tuned across the operational frequency range of 50 Mhz. The filter is also perfectly matched to the input and output transmission lines across the tunable frequency range. The filter is a 5 resonator design, and is implemented as cascaded 2 and 3 resonator filters. This design approach was taken to simplify the tuning of the filters, as it eliminates the second order effects of coupling to other than the adjacent resonator.

It is an object of the invention to provide a new RF receiver design.

This and other advantages, objects and features of the invention will become more apparent after considering the following description taken in conjunction with the illustrative embodiment in the accompanying drawings.

DETAILED DESCRIPTION OF THE PREFERRED EMBODIMENT

The present invention is a miniature RF receiver.

Figure 1:
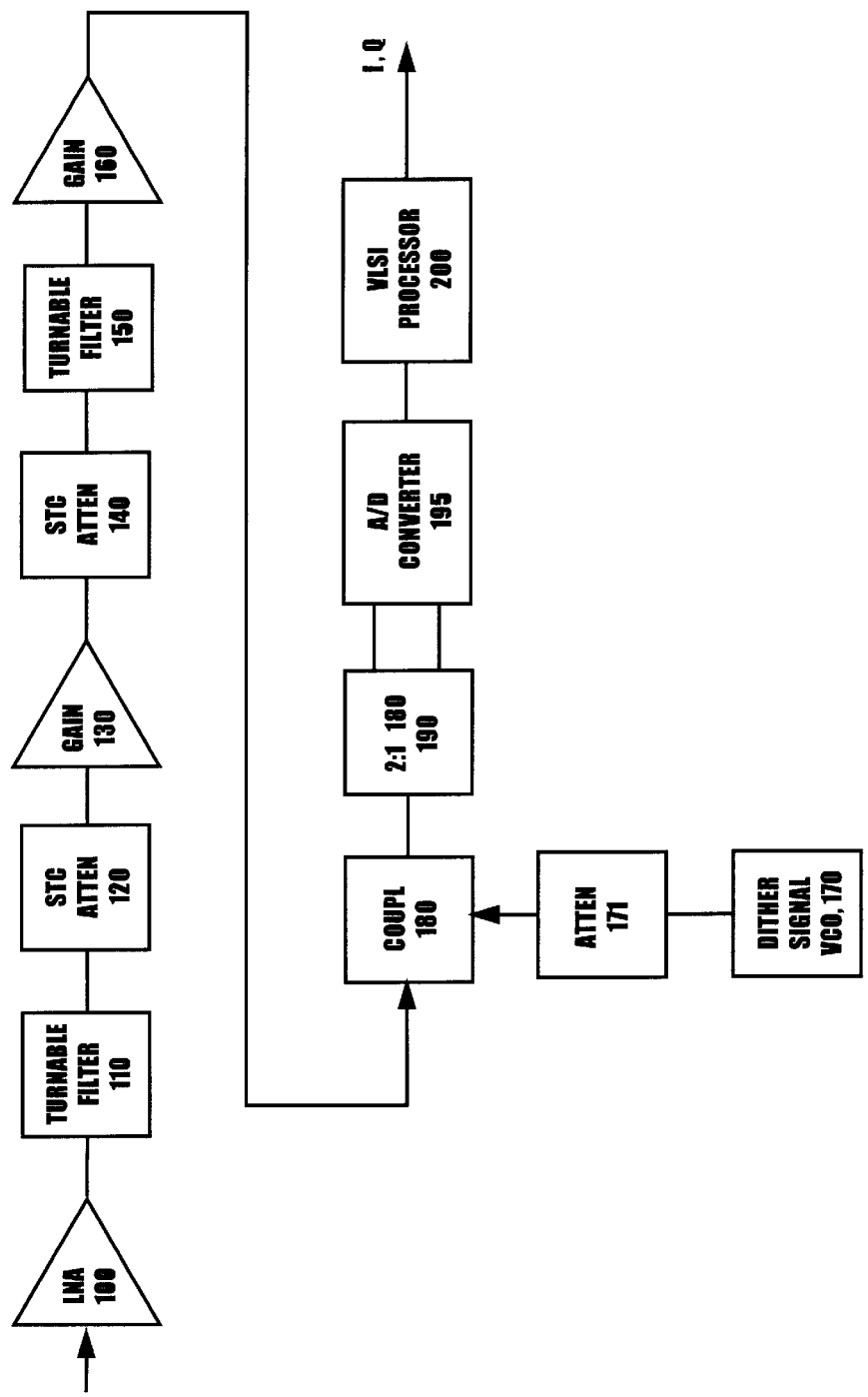
FIG. 1 is a block diagram of the present invention.

The reader's attention is now directed toward FIG. 1, which is a block diagram of the receiver. The tunable filters are combline filters with tuning varactor diodes terminating each printed resonator. The 1 dB bandwidth of the filter is 7 Mhz, and for resonator length constant across the tunable frequency range. The capacitance of a varactor diode is a function of applied voltage. By controlling the voltage to each varactor, the filter response can be tuned across the operational frequency range of 50 Mhz. The filter is also perfectly matched to the input and output transmission lines across the tunable frequency range. The filter is a 5 resonator design, and is implemented as cascaded 2 and 3 resonator filters. This design approach was taken to simplify the tuning of the filters, as it eliminates the second order effects of coupling to other than the adjacent resonator.

The receiver of FIG. 1 uses a low noise amplifier 100, a tunable filter 110, an alternator 120, an amplifier 130, a second attenuator 140, a cascaded tunable filter 150, an amplifier 160, a toggle system (VCO, 170 and attenuator 171), a coupler 180, and A/D converter 195, and a receiver signal processor 200.

The LNA 100 establishes the noise figure of the module and the gain buffers the losses of all components which follow it. The LNA that was used in our module has a 1.3 dB noise figure and a gain of 28 dB. The attenuation which is added to increase the dynamic range of the module is also split into two sections each having a maximum range of 10 dB. This gives the module a 20 dB increase in dynamic range as the noise floor remains constant, and the maximum signal is allowed to increase by 20 dB (the output signal remains constant). Gain stages are added to give the desired transfer function, and these stages serve to isolate reflections between components. Out of band noise is added to the receiver output through an internal coupler. A VCO is used to generate a signal at 750 Mhz which has its level set by an 8 bit attenuator and is finally injected into the receiver after all the gain stages.

The LNA 100 is a tunable amplifier and receiver modulated radio frequency signals in a tunable frequency range. Similarly the first tunable filter 110 filters the amplified output of the LNA at a selectable frequency range. The second tunable filter 150 is a cascaded filter that filters out secondary effects of coupling. Both filters 110 and 150 have their outputs respectively amplified by amplifiers 130 and 160.

The VCO 170, attenuator 171 and coupler 180 serve to toggle or activate the A/D converter 195 to digitize the signal for the receiver/processor 200.

An out of band signal is used to set an artificial noise floor on the A/D converter which can be easily filtered out in the signal processing. The final component in the receiver module is a custom built 2 way 180 degree divider which feeds the A/D converter a true differential signal. This divider design uses 45 degree high and lowpass filter networks which when cascaded will produce the even power split and perfect 180 degree phase shift.

The entire module is packaged in a 2" square housing. Using multi-layer construction techniques the size could be reduced without sacrificing performance. Several receive modules have been fabricated and tested, and burned in for over 1000 hours with no failures or degradation in performance.

Figure 2:
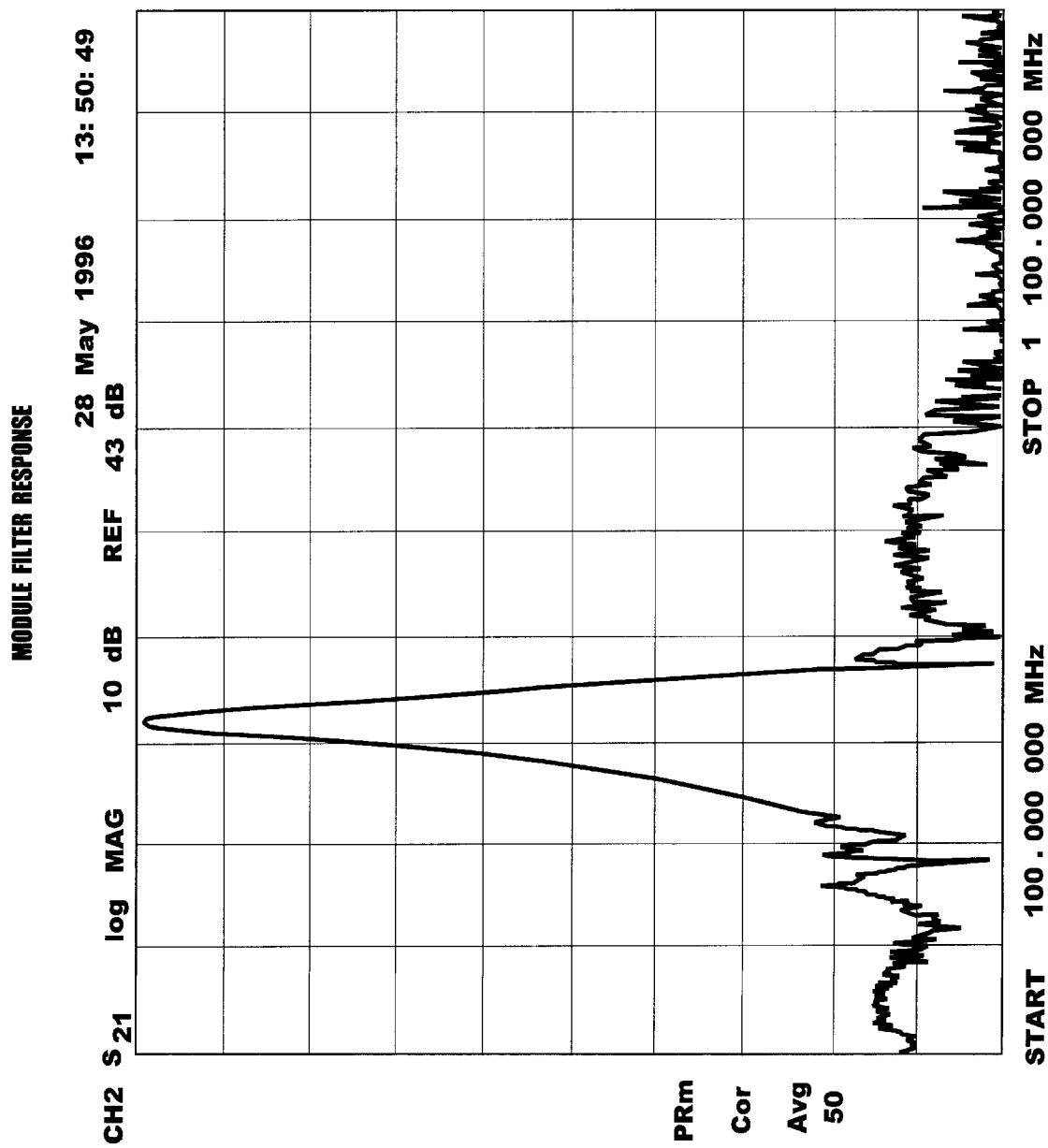
FIG. 2 is a chart of receiver performance.

As mentioned above, the block diagram of the digital module RF section is shown in FIG. 1. The overall gain of the module is 45 dB, and when large signals are present the gain can be reduced to 25 dB. The frequency response of the module is dominated by the response of the cascaded filter sections, and this response is shown in FIG. 2. This frequency response can be tuned to any frequency in the band 406–450 Mhz, by adjusting the voltage on the varactor diodes which terminate the 5 filter resonators. The response of this filter is added to the response of the digital filtering in the VLSI processing to establish the true bandwidth of the signal being sampled, and reject signals outside this band of interest. The dynamic range of this receiver is >72 dB and this level is established with the selection of the low noise amplifier (NF=1.3 dB, IP3=+32 dBm). The inline variable attenuators provide the ability to adjust differences between production modules, and allow the module to operate with large signals by reducing the gain by as much as 20 dB. In the reduced gain mode the noise floor of the module is increased by less than 1 dB for the maximum attenuation. This is accomplished by splitting the attenuator and having two cascaded units with a buffer amplifier in between them to control the noise floor.

The in band noise (those frequencies which pass through the tunable filters) is lower than the noise floor of the A/D converter. In normal operation of A/D converter the noise floor would be set at a level which would exercise the bottom two bits of the A/D. In this receiver design, the dynamic range of the E/D is extended with the digital and RF filtering, and the noise floor at the A/D is set to this level. Proper operation of the A/D requires at least a few of its bits to be toggling, and not to be in a situation where all signals are below the bottom bit. To accomplish this task, a VCO is used to produce a sine wave at a frequency far away from the band of interest. This signal has no spectral components in the operation band, and the frequency of this device can be controlled with a low current control voltage. The output of this device is about 0 dBm, and the level of this signal which is injected into the A/D can be controlled with a 5 bit variable attenuator. The signal is injected after all amplification, and physically enters the receive line thru a short (45 degree length at 750 Mhz) directional coupler.

The final component in the receiver module is a 2 way 180 degree power divider. The A/D requires a differential signal (equal amplitude opposite phase) input. To realize this device I designed a lumped element equivalent to a "ratrace hybrid." The phase differences between the arms of the hybrid are realized with sections of highpass and lowpass filters. The lowpass networks were designed to be 70.7 ohms impedance and −45 degrees long at the center frequency. The highpass networks were designed to be 70.7 ohms and +45 degrees long at the center frequency. By cascading sections and alternating highpass and lowpass arms, the desired equal amplitude and 180 degree phase difference was realized.

While the invention has been described in its presently preferred embodiment it is understood that that the words which have been used are words of description rather than words of limitation and that changes within the purview of the appended claims may be made without departing from the scope and spirit of the invention in its broader aspects.

What is claimed is:

1. A miniature radio frequency (RF) receiver comprising:
   a tunable low noise amplifier which produces an output signal by receiving and amplifying modulated RF signals, said tunable low noise amplifier processing a tunable frequency range;
   a tunable filter which processes the output signal of the tunable low noise amplifier to produce thereby a filtered output signal;
   a means for amplifying the filtered output signal to produce thereby an amplified filtered output signal;
   a cascaded filter that produces an output signal by filtering out second order coupling effects in the amplified filtered output signal;
   an A/D converter that converts the output signal of the cascaded filter into a digital signal;
   a signal processor that receives and processes the digital signal; and
   a toggle dither signal generator which activates the AID converter to process the output signal of the cascaded filter.

* * * * *